April 18, 1933.   F. H. MICHAELS   1,903,789
MEAT CUTTER
Filed Feb. 29, 1932
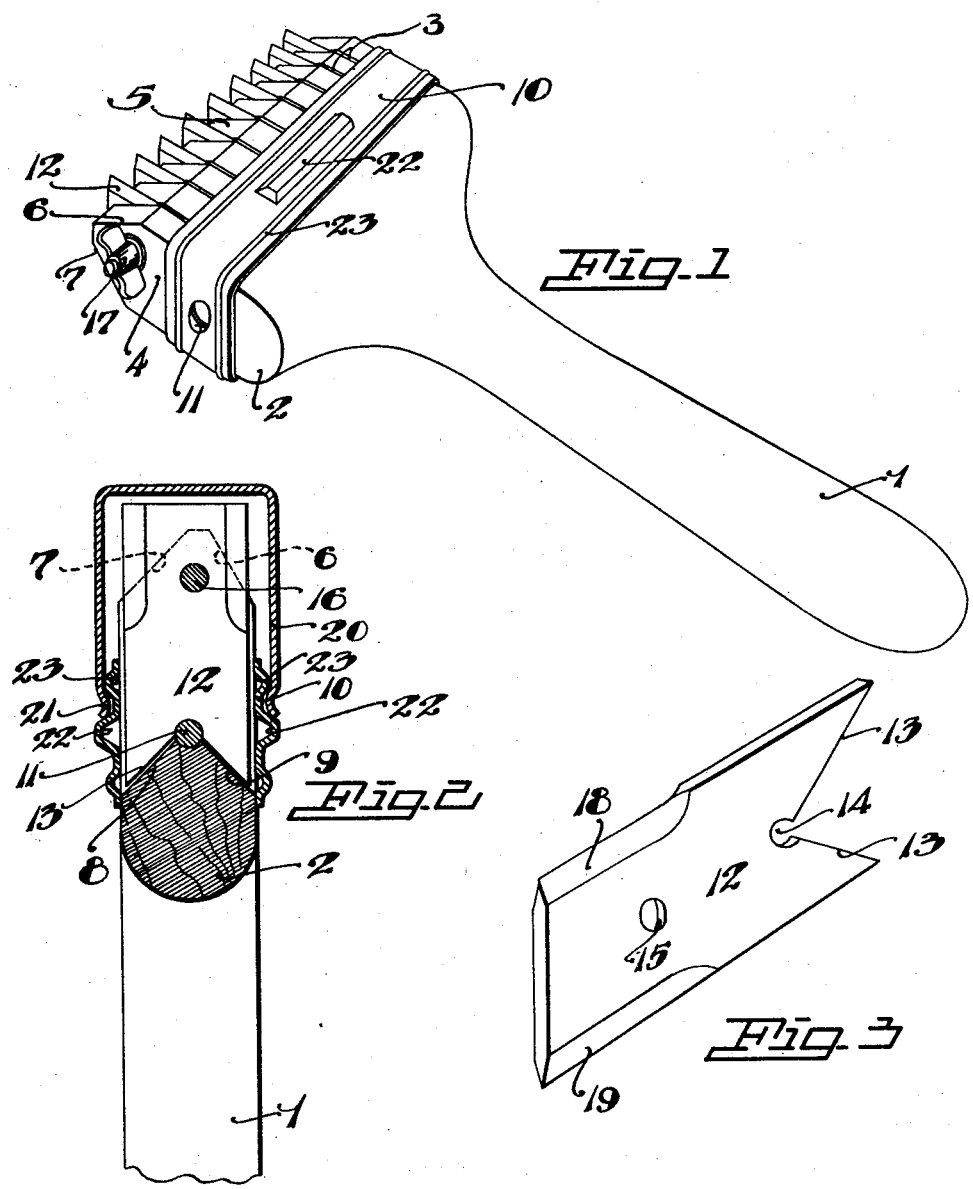
Frank H. Michaels
Inventor
By    Herbert R. Smith
Attorney Patented Apr. 18, 1933

1,903,789

UNITED STATES PATENT OFFICE

FRANK H. MICHAELS, OF DISHMAN, WASHINGTON

MEAT CUTTER

Application filed February 29, 1932. Serial No. 595,827.

My present invention relates to improvements in meat cutters of the multi-blade type, and is designed for use, as a hand tool or implement by the butcher, or other skilled person, in the preparation of cube-steaks and similar meat-cuts, for consumption in restaurants, roadside stands, lunch counters, and other eating places. As is well known, the cube-steak is prepared by cutting parallel kerfs in the steak, the meat cutter being manipulated, first, to cut a series of parallel kerfs in one direction, and then to cut a series of kerfs on lines at an angle to the first series of kerfs, the angle usually being at right angles to the first series of kerfs. By the utilization of the hand cutter of my invention, the butcher is enabled to select the most desirable direction and location of the first series of cuts or kerfs with relation to the bone and fatty portion of the steak, and then the second set of kerfs may with facility and convenience be cut on intersecting lines. The meat cutter is especially adapted for working around the bone of the steak and for cutting across the fatty portions of the steak, because of the facility with which it may be employed by the butcher.

The multi-blade cutter is fashioned in the form of a duplex implement or reversible tool and is provided with means whereby the depth of the kerfs may be varied, or rather whereby kerfs of different depths may be cut, as required, and without necessity for alteration or adjustment of parts.

The invention consists in certain novel combinations and arrangements of parts as will hereinafter be more fully set forth and claimed.

In the accompanying drawing I have illustrated one complete example of the physical embodiment of my invention wherein the parts are combined and arranged according to the best mode I have thus far devised for the practical application of the principles of my invention, and while the drawing shows one exemplifying structure, it will be understood that various alterations and changes may be made, within the scope of my appended claim without departing from the principles of my invention.

Figure 1 is a perspective view of a multi-blade meat cutter embodying my invention.

Figure 2 is a sectional view through the cutter-head, showing one of the blades, and showing also a cover or guard for the blades, when the implement is not in use.

Figure 3 is a perspective view of one of the duplex blades used in the cutter head.

In carrying out my invention I employ a short handle 1, to be grasped in a single hand, and the handle, which is fashioned from suitable material is provided with an integral cross-head 2, in which a series of transversely arranged kerfs 3 are formed. These kerfs or slits 3, in suitable number, are spaced equidistant and are parallel, and they extend rearwardly into the head a suitable distance from the front of the tool or implement.

These kerfs or slits 3 form a series of tongues, as 4, 4, for the tongues at the opposite ends of the head, and intermediate tongues 5 between these end tongues, and the material of which the tool is fashioned possesses sufficient resiliency to permit the tongues to be drawn together for the purpose of clamping the knives or blades 12 together, between adjoining tongues, as will be described.

As shown in Figure 1, and more accurately illustrated in Figure 2, the front end of the cutter head is fashioned with beveled faces 6 and 7, the faces of course extending across all of the tongues 4 and 5, and these beveled faces or gage faces extend from the opposite parallel faces of the head toward the longitudinal center line of the head. Thus, in Figure 2, as indicated by the dotted lines, the front edge of the gage face 6 terminates short of the longitudinal line, while the front edge of the gage face 7 terminates at approximately the longitudinal center line, and as a consequence a kerf of greater depth may be cut with the blades when the gage face 7 is used, than can be cut when the gage face 6 is employed. Thus, if the meat cutter is drawn over the steak for a deep cut, the tool is pressed into the face of the steak until the gage face 7 contacts with the face of the steak, and then as the multi-blade cutter is drawn over the steak, the gage face 7 gages the depth of the kerfs cut by the blades. For a more shallow depth of kerf, the duplex tool is reversed in its relation to the steak and the gage face 6 gages the depth of the more shallow kerfs.

As best seen in Figure 2 the rear walls of the slits or kerfs 3 of the head are arranged at angles 8 and 9, and a band or exterior ferrule 10 is secured around the head, covering the rear ends of the kerfs 3, a bolt or screw 11 being passed through the length of the head and employed for securing the band or ferrule in place.

I have illustrated nine cutter blades or knives 12 in the head, but it will be understood that the number of blades may be varied, and the size of the blades may be varied, together with accompanying or complementary alterations in the depth-gages of the head.

At their inner ends, the blades 12, which are of proper thickness to fit in the kerfs 3 of the cutter head, are cut out to form angle walls 13, 13, conforming to the angular walls 8 and 9 at the rear ends of the kerfs 3, and these angular walls 8, 9, and 13, coact to guide the blades as they are being pushed into position, and after they are in position, these walls co-act to brace the blades and to prevent even the slightest displacement of the blades.

The angular edges or walls 13 terminate in a semi-circular hole or socket 14 at the apex of the angle, and the socket of each blade fits over or straddles the bolt 11, as indicated in Figure 2, to further anchor the blades against movement or displacement with relation to the cutter head.

Near the front end of the blades, they are each provided with a bolt hole 15, and a tie bolt 16 passes lengthwise through the head, through the holes 15, and through alined holes in the tongues 4, 4, and 5, the tie bolt of course being employed to rigidly secure the alternating tongues and blades in a unitary structure, and a wing nut 17 on the protruding end of the bolt is employed to clamp the blades and tongues together.

As best seen in Figure 3 the blades 12 have duplex cutting edges 18 and 19 extending from the front end of the blade backwardly a sufficient distance to terminate back of the rear ends of the gage faces 6 and 7, and the cutting edges, which form continuations of the parallel edges of the blades, project forwardly of the bevel gage faces, thus rendering the duplex cutting edges of all the blades free of the head of the cutter, in order that the cutting edges may penetrate the steak and cut the kerfs therein for the purpose described.

As thus described it will be apparent that the blades of the multi-blade, duplex, cutter are rigidly secured between adjoining tongues by the tie bolt 16, and braced at their rear ends by the angular faces 8 and 9 of the head in co-action with the angular edges 13 of the blades, and that the rear bolt 11 also affords a centering and anchoring means for the blades.

In use, with the steak lying flat upon a board or table, the handle 1 is tilted upwardly to a position where the active gage-face of the cutter head is parallel with the face of the steak, and the cutter is drawn across the face of the steak, with the cutting edges of the blades passing through the steak with a shearing action that causes the blades to cut easily and smoothly through the meat to insure a uniform and clear cutting of the kerfs.

When the cutter is not in active use, a cover-protector as 20, of metal, is slipped over the cutting portion of the tool as a protection against the sharp cutting edges of the blades, as seen in Figure 2. This cover or cap, of resilient metal, is fashioned with spring edges 21, and the ferrule 10, permanently fixed on the cutter head, is provided with a pair of bosses 22, one at each side of the head. These bosses are located between ribs 23, fashioned along the opposite edges of the band or ferrule and forming with the bosses, grooves, into which the spring edges 21 of the cover may be snapped for the purpose of frictionally retaining the cover on the cutter head. The cover is of course, removed when the multi-blade cutter is to be employed.

Having thus fully described my invention, what I claim as new, and desire to secure by Letters Patent is:—

In a duplex-multi-blade, meat cutter, the combination with a head having oppositely disposed gage-faces with differing degrees of angularity, and said head having spaced kerfs forming tongues on the head, of a plurality of cutting blades mounted in the kerfs for co-action with the gage faces, and a fastening bolt passed through holes in said tongues and blades.

In testimony whereof I affix my signature.

FRANK H. MICHAELS.